(12) United States Patent
Hughes

(10) Patent No.: US 8,707,590 B2
(45) Date of Patent: Apr. 29, 2014

(54) FAILURE MECHANISM FOR MECHANICAL CONNECTION

(75) Inventor: Benjamin David Hughes, Northbridge (AU)

(73) Assignee: Sandvik Intellectual Property AB, Sanviken (SE)

( * ) Notice: Subject to any disclaimer, the term of this patent is extended or adjusted under 35 U.S.C. 154(b) by 374 days.

(21) Appl. No.: 13/133,231

(22) PCT Filed: Dec. 8, 2009

(86) PCT No.: PCT/AU2009/001589
§ 371 (c)(1),
(2), (4) Date: Oct. 4, 2011

(87) PCT Pub. No.: WO2010/065990
PCT Pub. Date: Jun. 17, 2010

(65) Prior Publication Data
US 2012/0030975 A1    Feb. 9, 2012

(30) Foreign Application Priority Data
Dec. 8, 2008  (AU) .................................. 2008906335

(51) Int. Cl.
*E02F 9/28*    (2006.01)
(52) U.S. Cl.
USPC ........................................................ 37/455
(58) Field of Classification Search
CPC ..... E02F 9/2816; E02F 9/2825; E02F 9/2833; E02F 9/2841; E02F 9/2866; E02F 9/2883
USPC ............................ 37/446, 452–460, 449, 450; 172/701.1–701.3, 753, 772; 403/350, 403/374.3, 374.4, 372, 379.3, 379.4
See application file for complete search history.

(56) References Cited

U.S. PATENT DOCUMENTS

| | | | |
|---|---|---|---|
| 5,653,048 A * | 8/1997 | Jones et al. | 37/452 |
| 5,713,145 A * | 2/1998 | Ruvang | 37/458 |
| 6,209,238 B1 * | 4/2001 | Ruvang | 37/455 |
| 6,240,663 B1 * | 6/2001 | Robinson | 37/458 |
| 6,729,052 B2 * | 5/2004 | Ollinger et al. | 37/452 |
| 7,219,454 B2 | 5/2007 | Maher | |
| 7,472,503 B2 | 1/2009 | Maher | |

FOREIGN PATENT DOCUMENTS

| | | |
|---|---|---|
| CA | 2311032 | 12/2001 |
| WO | 03/080946 | 10/2003 |

\* cited by examiner

*Primary Examiner* — Robert Pezzuto
(74) *Attorney, Agent, or Firm* — Morgan, Lewis & Bockius LLP

(57) ABSTRACT

A lock for an attachment system that connects a ground engaging tool to a bucket lip. The lock is disposed, in use, between lug of a lip of the bucket and the ground engaging tool. The lock has a body, a force applying member and a force receiving member. Application of force by the force applying member causes the force receiving member to protrude from a first side of the body and to engage the lug. Relative hardnesses of the lug, the body, the force applying member and the force receiving member are such that application of a sufficiently large force via the lug to the protruding portion of the force receiving member preferentially deforms the protruding portion of the force receiving member ahead of deformation of the body or the force applying member as a preferred lock failure mode.

11 Claims, 3 Drawing Sheets

| Test | Lug Engaging Member Hardness (Rc) | Bolt Hardness (Rc) | Maximum Load Tested (KN) | Observations |
|---|---|---|---|---|
| 1 | 43 | 40-41 | 550 | End of bolt mushrooming and seizing on threaded body at load indicated. Only small amount of permanent deformation on lug engaging member. |
| 2 | 43 | 43-44 | 550 | End of bolt mushrooming and seizing on threaded body at load indicated. Only small amount of permanent deformation on lug engaging member. |
| 3 | 43 | 43-44, End 52* | 550 | End of bolt mushrooming and seizing on threaded body at load indicated. Only small amount of permanent deformation on lug engaging member. |
| 4 | 43 | 47-50 | 650 | End of bolt mushrooming and seizing on threaded body at load indicated. Only small amount of permanent deformation on lug engaging member. |
| 5 | 43 | 50-53 | 700 | End of bolt mushrooming and seizing on threaded body at load indicated. Only small amount of permanent deformation on lug engaging member. |
| 6 | 32 | 40-41 | 800 | Lug Engaging Member mushrooming significantly and seizing on end of bore of clamping member body. Bolt still removable from body at load indicated. Lug engaging member able to be removed from bore by tightening bolt. |

* End of bolt in Test 3 induction hardened to 52 Rc

Figure 3

FAILURE MECHANISM FOR MECHANICAL CONNECTION

CROSS REFERENCE TO RELATED APPLICATIONS

This application is the National Stage of International Application No. PCT/AU2009/001589, filed Dec. 8, 2009, and claims benefit of Australian Application No. 2008906335 filed Dec. 8, 2008, both of which are herein incorporated by reference in their entirety.

FIELD OF THE INVENTION

The present invention relates to mechanical connection of wear parts to underlying structures. It has been created in relation to the connection of ground engaging tools to buckets of earth-moving equipment.

BACKGROUND TO THE INVENTION

Ground engaging tools (GET), for earth-moving equipment, such as those used in mining operations, operate in a highly abrasive environment and are subject to significant wear. GET such as bucket teeth thus require regular replacement.

Traditionally, GET are welded onto the lips of buckets. When the GET come to the end of their useful life, they can be cut from the bucket, and new GET welded in their place.

It will be appreciated that such cutting and re-welding operations are complex, time-consuming and relatively expensive. Further, they must generally be done in a workshop, requiring the bucket to be transported away from the earth-moving equipment.

Various mechanical attachment methods have been proposed in an attempt to alleviate these problems. Many of the methods involve the use of bolts and similar fastening devices, inserted within the lip of the bucket. In general, such devices have proved to be of limited use. The insertion of a bolt or similar within a bucket lip can lead to undesirable stress concentrations within the lip, resulting in cracking of the bucket lip. Even where this is avoided, the large forces to which GET are exposed have a tendency to deform connecting bolts, thus making difficult their subsequent extraction using mechanical tools. Indeed, in some cases the deformation can be so severe that the GET must be cut away, completely negating any advantage of mechanical connection.

In response to these issues, the applicant has devised a number of mechanical connection means which overcome these problems. Examples of the applicant's devices are detailed in U.S. Pat. No. 7,219,454 and in U.S. patent application Ser. No. 10/509,016, the contents of which are included herein by reference.

These connection means involve the use of a shroud which mounts about a lug or boss on the lip of an excavator bucket; a locking device which locates between the shroud and the boss; and the application of an external compressing force to maintain the relative position of the shroud, locking device and boss.

Although these connection means have proved far less susceptible to deformation than previous mechanical connectors, there have nonetheless been occasions where the connection means have failed due to a load being applied which is higher than the means can bear. Where the external compressing force has been applied by a threaded element, such as that described in U.S. application Ser. No. 10/509,016, one mode of failure observed has been the deformation of the mating threads between the force applying element and the locking device.

When such a failure occurs, the force applying element (a bolt) seizes within the locking device. It can then be difficult or impossible to remove the bolt using normal mechanical tools.

Depending on the relative hardness of the bolt and the locking device, deformation of the threads of either can occur. In either case, the result can be seizure of the locking device.

The present invention seeks to provide a means by which such seizure of the locking devices can be substantially avoided.

SUMMARY OF THE INVENTION

The invention achieves its effect by providing a failure mode for mechanical connection means which does not result in seizure of a locking device within the mechanical connection means.

In accordance with a first aspect of the present invention there is provided a lock for use in an attachment system, the lock having a body, a force applying member and a force receiving member, such that the application of force by the force applying member causes the force receiving member to protrude from a first side of the body, and where the relative hardnesses of the body, the force applying member and the force receiving member are such that the application of a sufficiently large force to the protruding portion of the force receiving member will preferentially cause deformation of the protruding portion of the force receiving member ahead of deformation of the body or the force applying member.

In accordance with a second aspect of the present invention there is provided a lock for use in an attachment system, the lock having a body, a force applying member and a force receiving member, such that the application of force by the force applying member causes the force receiving member to protrude from a first side of the body, and where the hardness of the force applying member is larger than that of the force receiving member, so that the application of a sufficiently large force to the protruding portion of the force receiving member will preferentially cause deformation of the force receiving member ahead of deformation of the force applying member.

In accordance with a third aspect of the present invention there is provided an attachment system for connecting a ground engaging tool to a bucket lip, the bucket lip having a lug attached thereto, the ground engaging tool having a recess which receives the lug in use, a lock being disposed, in use, between the lug and the ground engaging tool, the lock having a body, a force applying member and a force receiving member, such that the application of force by the force applying member causes the force receiving member to protrude from a first side of the body and to engage the lug, and where the relative hardnesses of the lug, the body, the force applying member and the force receiving member are such that the application of a sufficiently large force via the lug to the protruding portion of the force receiving member will preferentially cause deformation of the protruding portion of the compressing member ahead of deformation of the body or the force applying member.

If a sufficient force is applied to cause deformation of the lock, the arrangement is such that this force will preferentially result in deformation of the force receiving member. Deformation of this member allows the lock to continue to perform its locking function, and also be readily removed when necessary.

Preferably, the force applying member is located in a threaded connection extending internally of a second side of the body, the second side of the body being opposite the first side. It is preferred that the force applying member is substantially axially aligned with the force receiving member.

The force receiving member may be substantially cylindrical in shape. In a preferred embodiment, the force receiving member has a bevelled outer edge, located within the protruding portion. This allows a small degree of plastic deformation of the force receiving member to occur without significantly affecting operation of the lock.

The force receiving member may have a hardness less than 90% of the hardness of the force applying member. It is preferred that the ratio of hardness of the force receiving member to the force applying member be between 0.7 and 0.9. Testing has suggested that a hardness ratio of about 0.8 provides an efficacious result.

BRIEF DESCRIPTION OF THE DRAWINGS

It will be convenient to further describe the invention with reference to preferred embodiments of the attachment system and clamping member of the present invention. Other embodiments are possible, and consequently, the particularity of the following discussion is not to be understood as superseding the generality of the preceding description of the invention. In the drawings:

FIG. 1a is an enlarged portion of a region of FIG. 1;

FIG. 2a is an enlarged portion of a region of FIG. 2.

FIG. 3 is a table of data and observations from tests conducted on a lock according to an embodiment of the present invention.

DESCRIPTION OF PREFERRED EMBODIMENT

Figure 1:
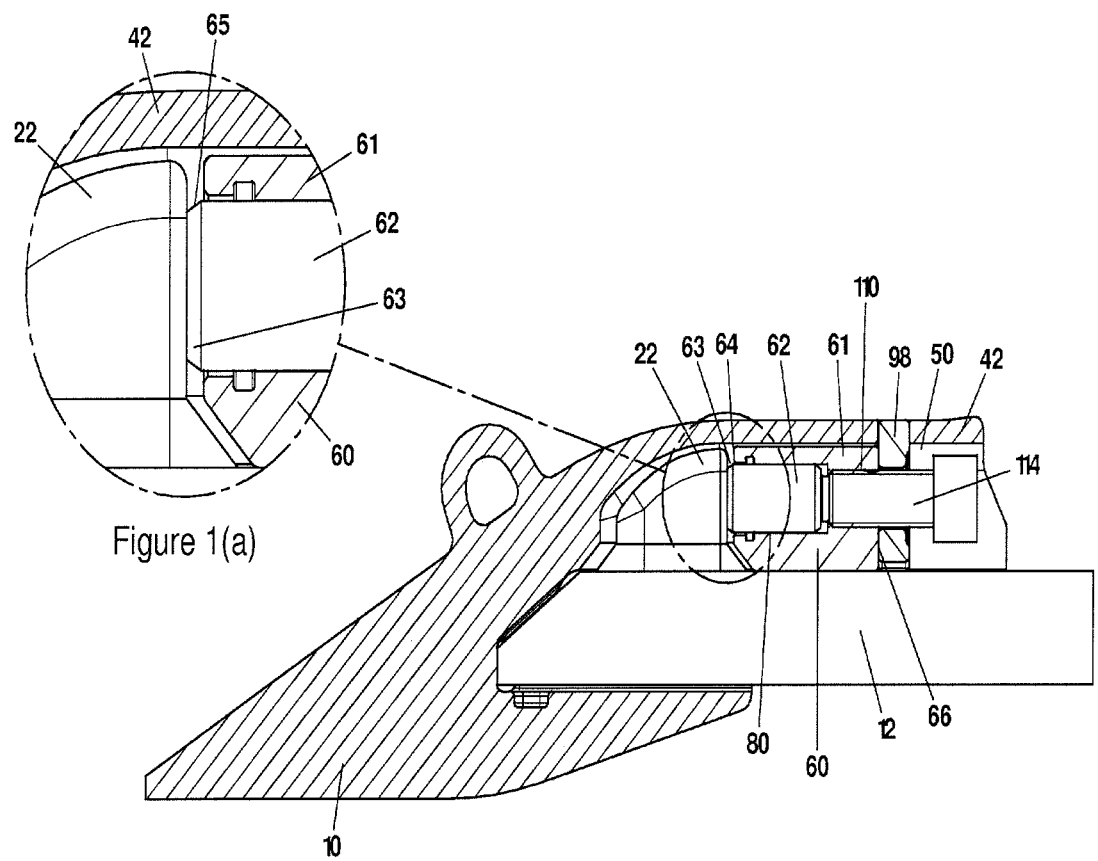
FIG. 1 is a cross-sectional view of a ground engaging tool connected to a bucket lip using an attachment system in accordance with the present invention.
Figure 2:
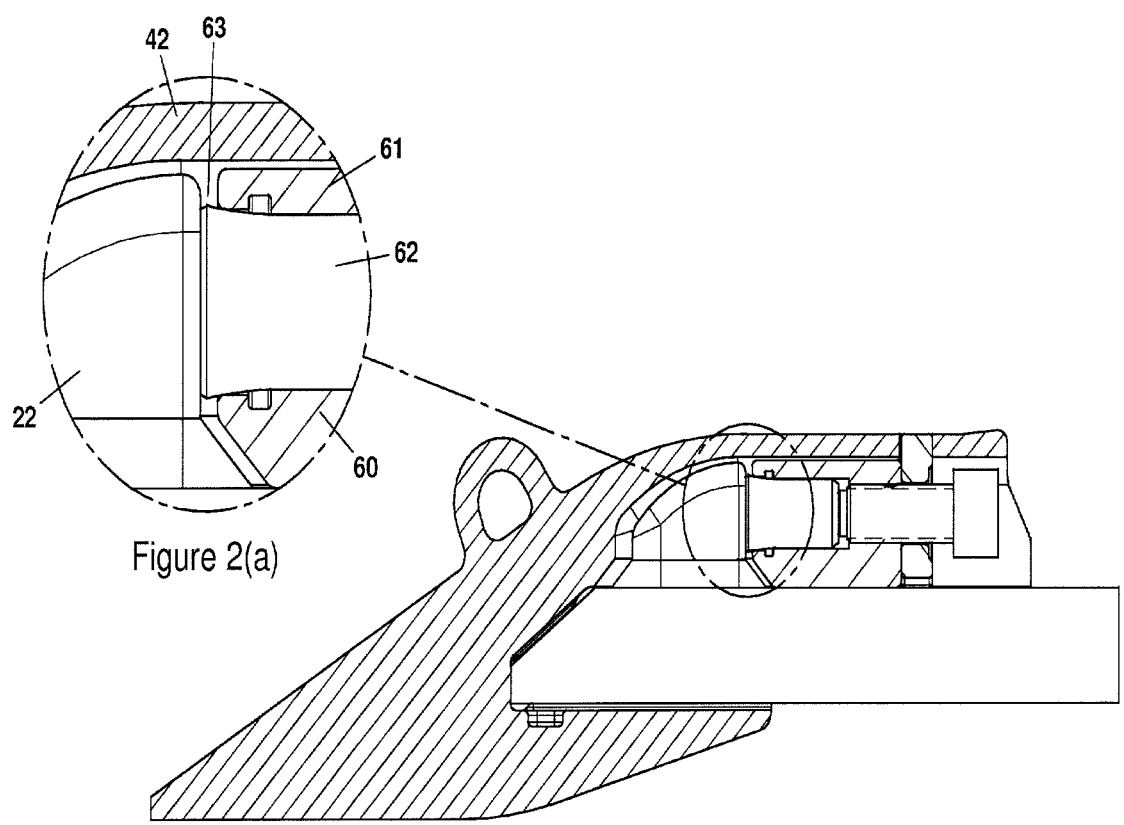
FIG. 2 is a cross-sectional view of the arrangement of FIG. 1, shown after plastic deformation within the attachment system.

FIGS. 1 and 2 show a ground engaging tool 10 attached to a bucket lip 12, substantially in accordance with the applicant's U.S. Pat. No. 7,219,454 and U.S. patent application Ser. No. 10/509,016.

The bucket lip 12 includes a lug 22 on its upper face. The lug 22 is attached to the bucket lip 12 by suitable means such as welding.

The ground engaging tool 10 includes an attachment portion 42, extending across the upper face of the bucket 12, and having an engaging recess 50 located adjacent the upper face of the bucket 12. The engaging recess 50 has a first portion arranged to locate about the lug 22.

The ground engaging tool 10 also has a stabilizing member 98, which is inserted within an aperture of the attachment portion 42 away from the lug 22. A second portion of the engaging recess 50 is thus defined between the lug 22 and the stabilizing member 98. A lock 60 is located within this second portion of the engaging recess 50.

The lock 60 has three main elements: a body 61, a force applying member in the form of a substantially cylindrical bolt 114, and a force receiving member in the form of a substantially cylindrical lug engaging member 62.

The body 61 has a first side 64 oriented towards the lug 22, and a second side 66 opposite the first side 64. The second side 66 is thus oriented toward the stabilizing member 98.

The lug engaging member 62 is largely contained within a chamber 80 extending inwardly within the body from the first side. An outer portion 63 of the lug engaging member 62 protrudes from the first side 64, so that it engages with the lug 22.

The body 61 has a substantially cylindrical slot 110 extending from the chamber 80 to the second side 66 of the body 61. The slot 110 is internally threaded.

The bolt 114 is externally threaded, and is arranged to engage with the internally threaded slot 110. The bolt 114 is advanced into the slot so as to provide a force on the rear of the lug engaging member 62. This pushes the outer edge 63 of the lug engaging member 62 against the lug 22. Further advancement of the bolt 114 increases the compressive loading on the lug engaging member 62. This compressive force acts against the lug 22, and the opposing force is transmitted in turn through the bolt 114, via the threaded connection to the body 61, then the stabilizing member 98 and the attachment portion 42 of the ground engaging tool 10. The resultant force on the ground engaging tool 10 thus promotes tight engagement of the ground engaging tool 10 with the bucket lip 12.

This is the arrangement shown in FIG. 1, and described in the applicant's prior patents referred to above.

The applicant has now done some experimental work on failure mechanisms of this arrangement. During use, the ground engaging tool 10 may be subject to forces which result in stresses on components of the attachment system which are beyond their yield strength. This results in deformation of those components.

It will be appreciated that the stress concentrations caused will be largely dictated by the geometry of the components concerned. It will also be appreciated that the yielding point will be a combination of both the stress applied and the component hardness.

The present invention proposes arranging the components in such a way that yielding occurs in the protruding part of the lug engaging member 62, adjacent the outer edge 63. This can be achieved through a combination of a number of mechanisms, including appropriate choice of materials for the various components, appropriate hardness treatments, and appropriate design of the relevant geometry such that particularly high stress concentrations in the threads and against the stabilizing member are avoided. In particular it is important to design and treat both the internal threads of the body 61 and the external threads of the bolt 114 so that the protruding part of the lug engaging member 62 deforms in preference to the threads.

The resulting deformation can be seen in FIG. 2. The effect is a 'mushrooming' of the lug engaging member 62. The result of this mushrooming will be that the lug engaging member 62 will not be able to be withdrawn into the chamber 80. Nonetheless, the bolt 114 will still be able to be tightened, to restore the required clamping force, and will also be able to be removed, allowing for removal of the stabilizing member 98 and the lock 60. The ground engaging tool 10 can then be removed and replaced as required.

If reuse of the lock 60 is desired, it will be simple to remove the deformed lug engaging member 62 by the simple expedient of pulling out the deformed member 62, or by advancing the bolt 114 through the chamber 80 after the lock 60 has been removed from the ground engaging tool 10. A new lug engaging member 62 can then be pushed into position.

In the embodiment of the drawings, it will be seen that the lug engaging member 62 has a bevel 65 about the outer edge 63. One advantage of this is that a small degree of plastic deformation will not affect use of the lock 60. Only deformation which has the effect of expanding the diameter of the outer edge 63 beyond that of the chamber 80 will cause the device to be deformed beyond the point where the lug engaging member can be withdrawn into the chamber 80. Small deformations will thus not prevent the ready re-use of the device.

Tests have been conducted to determine relative hardnesses of the bolt 114 and the lug engaging member 62.

The table in FIG. 3 shows the results of controlled tests performed on a lock 60 as described above. The tests were performed in a hydraulic press, at incremental loadings stepped in 50 KN increments.

| Test | Lug Engaging Member Hardness (Rc) | Bolt Hardness (Rc) | Maximum Load Tested (KN) | Observations |
| --- | --- | --- | --- | --- |
| 1 | 43 | 40-41 | 550 | End of bolt mushrooming and seizing on threaded body at load indicated. Only small amount of permanent deformation on lug engaging member. |
| 2 | 43 | 43-44 | 550 | End of bolt mushrooming and seizing on threaded body at load indicated. Only small amount of permanent deformation on lug engaging member. |
| 3 | 43 | 43-44, End 52* | 550 | End of bolt mushrooming and seizing on threaded body at load indicated. Only small amount of permanent deformation on lug engaging member. |
| 4 | 43 | 47-50 | 650 | End of bolt mushrooming and seizing on threaded body at load indicated. Only small amount of permanent deformation on lug engaging member. |
| 5 | 43 | 50-53 | 700 | End of bolt mushrooming and seizing on threaded body at load indicated. Only small amount of permanent deformation on lug engaging member. |
| 6 | 32 | 40-41 | 800 | Lug Engaging Member mushrooming significantly and seizing on end of bore of clamping member body. Bolt still removable from body at load indicated. Lug engaging member able to be removed from bore by tightening bolt. |

*End of bolt in Test 3 induction hardened to 52 Rc

These results suggest that the hardness of the lug engaging member must be significantly less than that of the bolt in order for mushrooming of the lug engaging member to preferentially occur. In particular, it suggests that the ratio of hardness of the lug engaging member to that of the bolt needs to be about 0.8 or below.

Modifications and variations as would be apparent to a skilled addressee are deemed to be within the scope of the present invention.

The invention claimed is:

1. A lock for use in an attachment system, the lock having a body, a force applying member and a force receiving member, such that the application of force by the force applying member causes the force receiving member to protrude from a first side of the body, and where relative hardnesses of the body, the force applying member and the force receiving member are such that the application of a sufficiently large force to a protruding portion of the force receiving member will preferentially cause deformation of the protruding portion of the force receiving member ahead of deformation of the body or the force applying member.

2. A lock as claimed in claim 1, wherein the force applying member is located in a threaded connection extending internally of a second side of the body, the second side of the body being opposite the first side.

3. A lock as claimed in claim 2, wherein the force applying member is substantially axially aligned with the force receiving member.

4. A lock as claimed in claim 1, wherein the force receiving member is substantially cylindrical in shape.

5. A lock as claimed in claim 4, wherein the force receiving member has a bevelled outer edge, located within the protruding portion.

6. A lock as claimed in claim 1, wherein the force receiving member has a hardness less than 90% of the hardness of the force applying member.

7. A lock as claimed in claim 6, wherein the ratio of hardness of the force receiving member to the force applying member is between 0.7 and 0.9.

8. A lock as claimed in claim 7, wherein the ratio of hardness of the force receiving member to the force applying member is about 0.8.

9. An attachment system for connecting a ground engaging tool to a bucket lip, the bucket lip having a lug attached thereto, the ground engaging tool having a recess which receives the lug in use, a lock being disposed, in use, between the lug and the ground engaging tool, the lock having a body, a force applying member and a force receiving member, such that the application of force by the force applying member causes the force receiving member to protrude from a first side of the body and to engage the lug, and where relative hardnesses of the lug, the body, the force applying member and the force receiving member are such that the application of a sufficiently large force via the lug to a protruding portion of the force receiving member will preferentially cause deformation of the protruding portion of the force receiving member ahead of deformation of the body or the force applying member.

10. An attachment system as claimed in claim 9 wherein the hardness of the force applying member is larger than that of the force receiving member.

11. A lock for use in an attachment system, the lock having a body, a force applying member and a force receiving member, such that the application of force by the force applying member causes the force receiving member to protrude from a first side of the body, and where hardness of the force applying member is larger than that of the force receiving member, so that the application of a sufficiently large force to a protruding portion of the force receiving member will preferentially cause deformation of the force receiving member ahead of deformation of the force applying member.

* * * * *